US006253332B1

(12) United States Patent
Hassan

(10) Patent No.: US 6,253,332 B1
(45) Date of Patent: Jun. 26, 2001

(54) APPARATUS FOR GENERATING SHIFTED DOWN CLOCK SIGNALS

(75) Inventor: Kazi M. Hassan, Sunnyvale, CA (US)

(73) Assignee: Sun Microsystems, Palo Alto, CA (US)

( * ) Notice: Subject to any disclaimer, the term of this patent is extended or adjusted under 35 U.S.C. 154(b) by 0 days.

(21) Appl. No.: 09/204,737

(22) Filed: Dec. 2, 1998

(51) Int. Cl.[7] ................................................. G06F 1/04
(52) U.S. Cl. ............................................. 713/500; 713/600
(58) Field of Search ................................... 713/500, 501

(56) References Cited

U.S. PATENT DOCUMENTS

| 3,688,036 | * | 8/1972 | Bland | 178/68 |
| 3,922,685 | * | 11/1975 | Opas | 343/854 |
| 3,932,865 | * | 1/1976 | Sagara et al. | 340/347 |
| 4,497,060 | * | 1/1985 | Yang | 375/22 |
| 4,587,519 | * | 5/1986 | Munetsugu et al. | 340/711 |
| 5,589,790 | * | 12/1996 | Allen | 327/333 |
| 5,732,249 | * | 3/1998 | Masuda et al. | 713/503 |
| 5,900,768 | * | 5/1999 | Price | 327/427 |
| 6,035,358 | * | 3/2000 | Tanikawa | 710/102 |
| 6,065,129 | * | 5/2000 | Sakamoto et al. | 713/500 |

* cited by examiner

Primary Examiner—Bipin Shalwala
Assistant Examiner—Nitin Patel
(74) Attorney, Agent, or Firm—Sierra Patent Group, Ltd.

(57) ABSTRACT

An apparatus for reducing the magnitude of an external clock signal is provided wherein the external clock signal is provided on the motherboard of a computer, the signal is provided onto a plug-in CCA, and the signal must pass through a resistive voltage divider prior to being provided to circuits requiring the reduced magnitude signal.

9 Claims, 4 Drawing Sheets

APPARATUS FOR GENERATING SHIFTED DOWN CLOCK SIGNALS

BACKGROUND OF THE INVENTION

1. Field of the Invention

The present invention relates to electronic systems utilizing clock signals. More particularly, the present invention provides a method and apparatus for shifting the voltage level and swing of clock pulses.

2. The Background Art

Modern electronic systems, especially computer systems, utilize clock signals to provide timing synchronization to the various devices present in the system.

Clock signals that are only used internal to a given device are usually supplied within that device by a clock source of some sort. Other clock signals are provided by the system in order to ensure that devices within the system are synchronized by receiving the same signal transitions at the same time. Often these system-supplied clock signals are used internally within a given system device, rather than the device supplying an independent clock signal.

FIG. 1 is a block diagram showing various computer components and their relation to a system-provided clock.

Referring to FIG. 1, a computer 10 comprises a power supply 12, memory cards 14, removable circuit card assemblies (CCA's) 16a, 16b, 16c, and 16d, other devices 18, and clock source 20. CCA's 16a, 16b, 16c, and 16d may comprise video devices, audio devices, ethernet devices, or any other type of assembly that requires access to a common bus that is present within the system.

Individual ones of CCA's 16a, 16b, 16c, and 16d may or may not require an outside system clock. In the event that access to the system clock is required, it is provided to a given one of CCA's 16a, 16b, 16c, and 16d through the proper ones of connector interfaces 22a, 22b, 22c, and 22d respectively, depending on which of CCA's 16a, 16b, 16c, and 16d require access to the system clock.

FIG. 2 is a schematic diagram depicting a prior art CCA.

Referring to FIG. 2, CCA 16 comprises a system clock source 20, the output of which passes through connector interface 22 to clock device 24 which buffers the incoming clock signal and provides it to processor 26, memory 28, buffer 30, and other devices 32, CCA components which are representative of what may or may not be on a given plug-in card in a given computer.

Although the providing of a system clock signal to CCA-level components is desirable for many reasons, problems arise when the level of technology increases faster than hardware is replaced. Motherboards which are designed and manufactured using one level of technology, and CCA's designed and manufactured using a later technology may have incompatible clock signal levels, causing critical malfunctions.

One possible incompatibility between clock signals is the voltage level used, and the voltage swing between transitions from low to high, and from high to low. Later technology typically operates at lower voltage levels than earlier technology. Thus a CCA made with a later technology than contained on the motherboard will often require lower clock signal levels than which are present on the motherboard. The requirement of the lower clock signal levels on the CCA as compared to the motherboard makes it necessary for CCA designers to take into account the higher incoming voltage levels, and compensate in some way on the CCA so as to prevent critical malfunctions and to prevent possible damage to CCA components.

A prior art solution which decreases the magnitude of incoming clock signals involves putting capacitors such as capacitors 34a through 34f in series with the clock signal paths.

This prior art solution provides a maximum signal level that is within the magnitude desired by the new technology logic, but which has several drawbacks.

First, although the maximum incoming clock signal voltage is reduced for use on a CCA by adding capacitors in series with the signal path, the voltage swing between a "low" and a "high" is also comparatively reduced, significantly increasing the possibility that a low may be mistaken for a high, or that a high may be mistaken for a low.

Second, the prior art solution uses capacitors to solve the signal level problem. Capacitors inherently have very loose tolerances on their value when manufactured. Thus, the values of installed capacitors may significantly vary from CCA to CCA, and thus CCA's may vary from system to system in the way they respond to the converted clock signal levels.

Third, installing capacitors on CCA's requires the use of valuable board space, thus precluding the use of the space for other valuable purposes. In modern electronics, there is a strong desire to eliminate unnecessary components, leaving as much board space as possible for other, more desired uses.

OBJECTS AND ADVANTAGES OF THE INVENTION

It is an object and advantage of the present invention to provide a method and apparatus for reducing the maximum incoming clock signal level without reducing the voltage swing between a logical low and a logical high.

It is a further object and advantage of the present invention to provide a method and apparatus for reducing the maximum incoming clock signal level using components having predictable, tight tolerances.

It is yet a third object and advantage of the present invention to provide a method and apparatus for reducing the maximum incoming clock signal level, which maximizes the amount of CCA space available for other circuitry.

SUMMARY OF THE INVENTION

An apparatus for reducing the magnitude of a external clock signal is provided wherein the external clock signal is provided on the motherboard of a computer, the signal is provided onto a plug-in CCA, and the signal must pass through a plurality of resistors prior to being provided to circuits requiring the reduced magnitude signal.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

Figure 3:
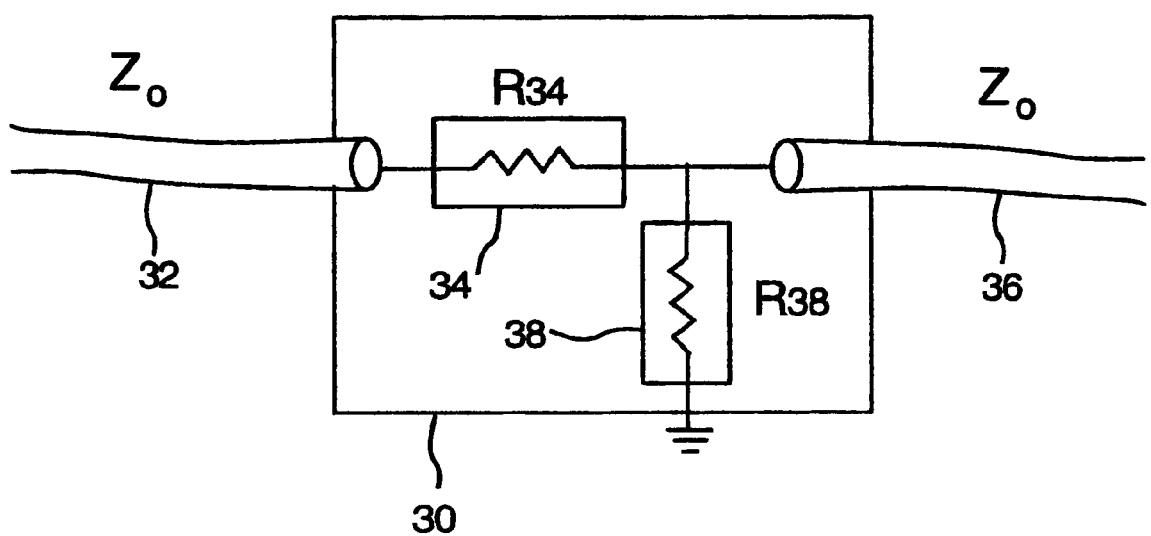
FIG. 3 is a schematic diagram depicting a presently preferred embodiment of the present invention.

FIG. 3 is a schematic diagram depicting a presently preferred embodiment of the present invention.

Referring to FIG. 3, coupler 30 comprises a transmission line 32 coupled to the input of resistor 34. The output end of resistor 34 is coupled to a second transmission line 36, and also coupled to the input of resistor 38. The output end of resistor 38 is coupled to ground.

Coupler 30 provides a simple, resistive apparatus for converting a signal having a given maximum voltage level and a given swing between high and low, into a signal having the same swing, but a different maximum level.

Recall that the prior art apparatus utilized the capacitors to reduce the voltage level of the incoming signal. The desired capacitance is computed by taking into account the capacitive reactance which acts similar to a resistance in that a voltage drop occurs across the capacitor which is inversely proportional to the frequency of the signal involved, as well as inversely proportional to the capacitance of the capacitor.

Recall that three major drawbacks with using capacitors are 1) that capacitors vary widely in their measured values, and 2) capacitors will react to signals differently depending on the frequency of the signal, thus requiring a different design for each different clock frequency.

The present invention solves these drawbacks by using resistive components which typically have tolerances of ten percent or less, and which have frequency independent characteristics. By using components that have frequency independent characteristics, the design may be used with any frequency clock, without a worry that the clock signal characteristics will vary from what the designer intended.

Referring again to FIG. 3, an assumption is made that the impedance of transmission line 36 and transmission line 34 are both equal. This is valid because both transmission lines are signal traces on a circuit card assembly, and as such have predictable and stable characteristics.

Resistor 34 and resistor 38 represented in the equation below as $R_{34}$ and $R_{38}$ respectively, and $Z_0$ represents the impedance of transmission lines 32 and 36. The output voltage of the circuit is given by $$V_{out}=V_{in}[(R_{38}\|Z_0)/(R_{38}\|Z_0)+R_{34}]$$

Figure 4:
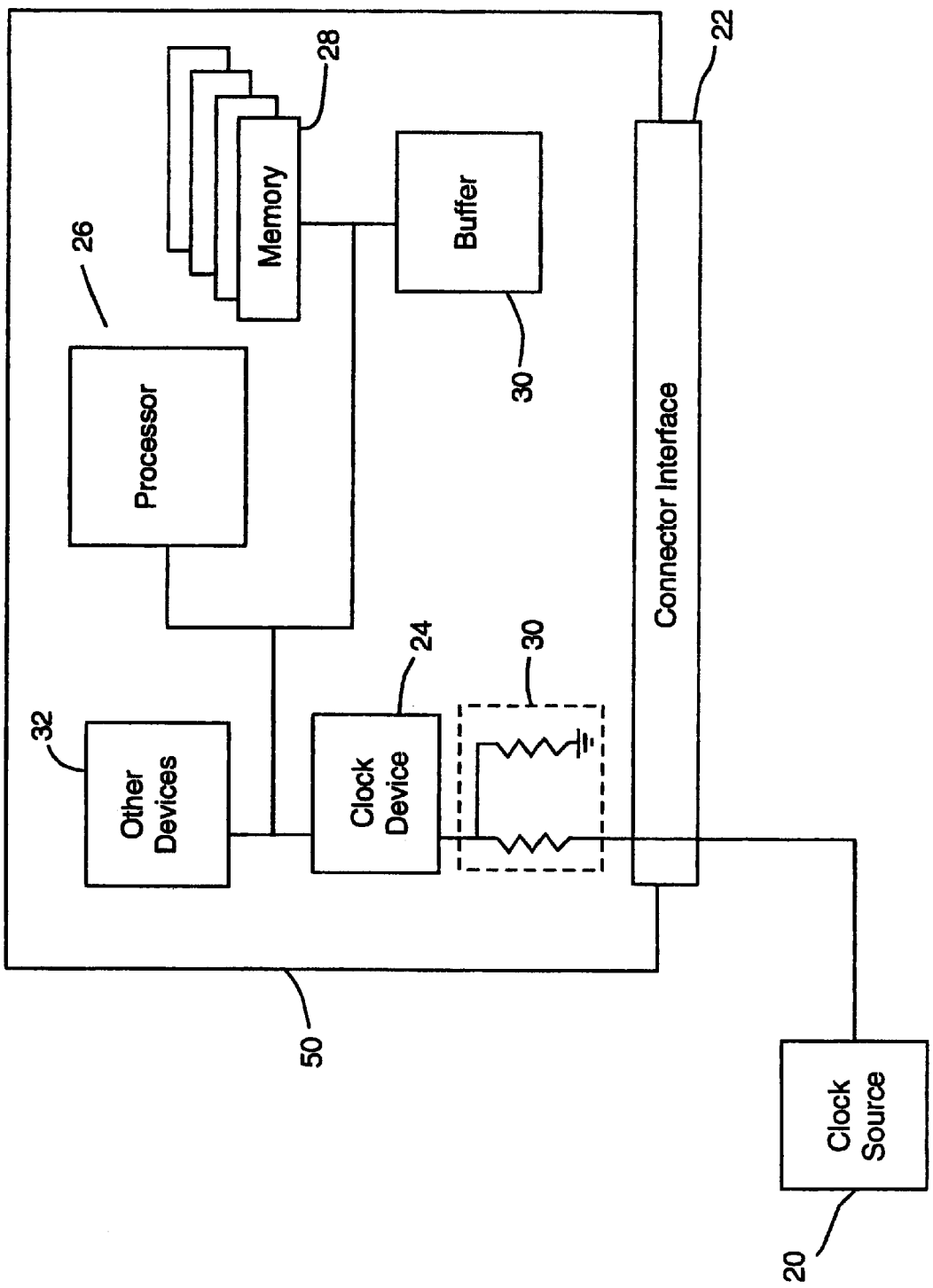
FIG. 4 is a block diagram of a CCA employing a presently preferred embodiment of the present invention.

FIG. 4 is a CCA employing a present preferred embodiment of the present invention.

Figure 1:
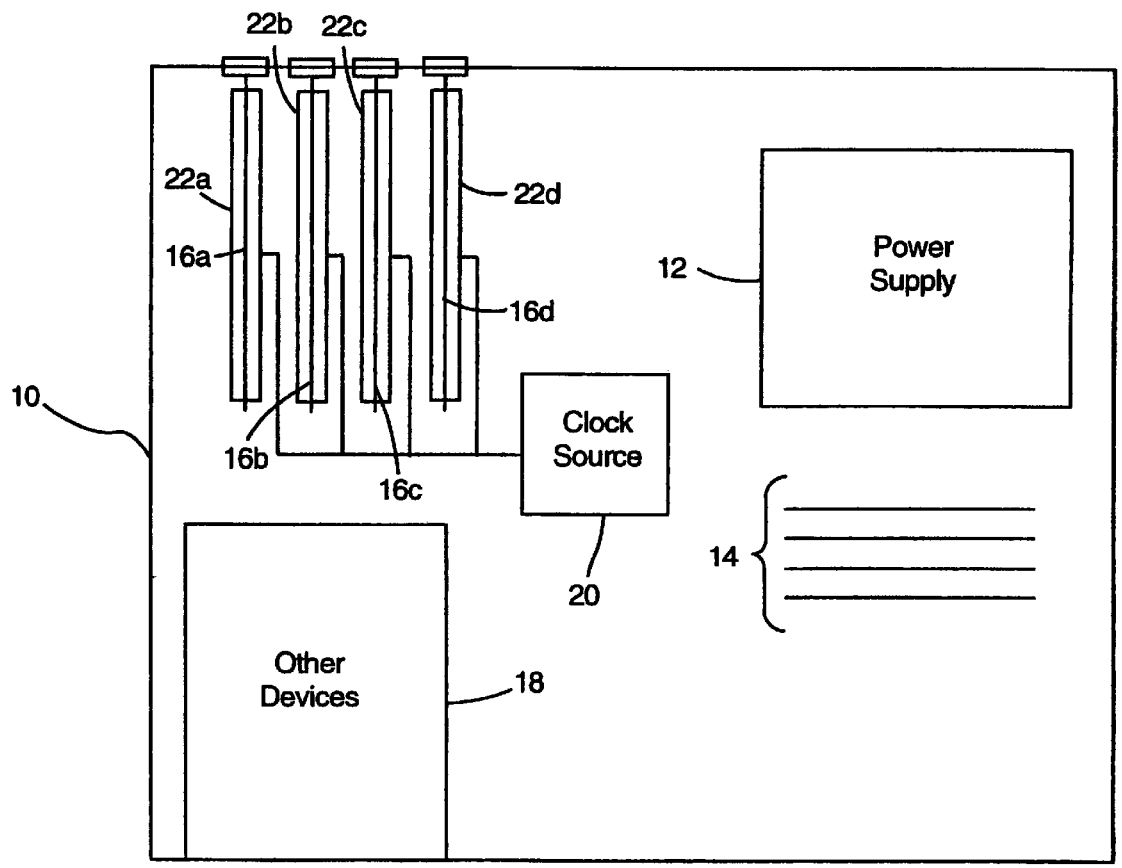
FIG. 1 is a block diagram showing various computer components and their relation to s system-provided clock.
Figure 2:
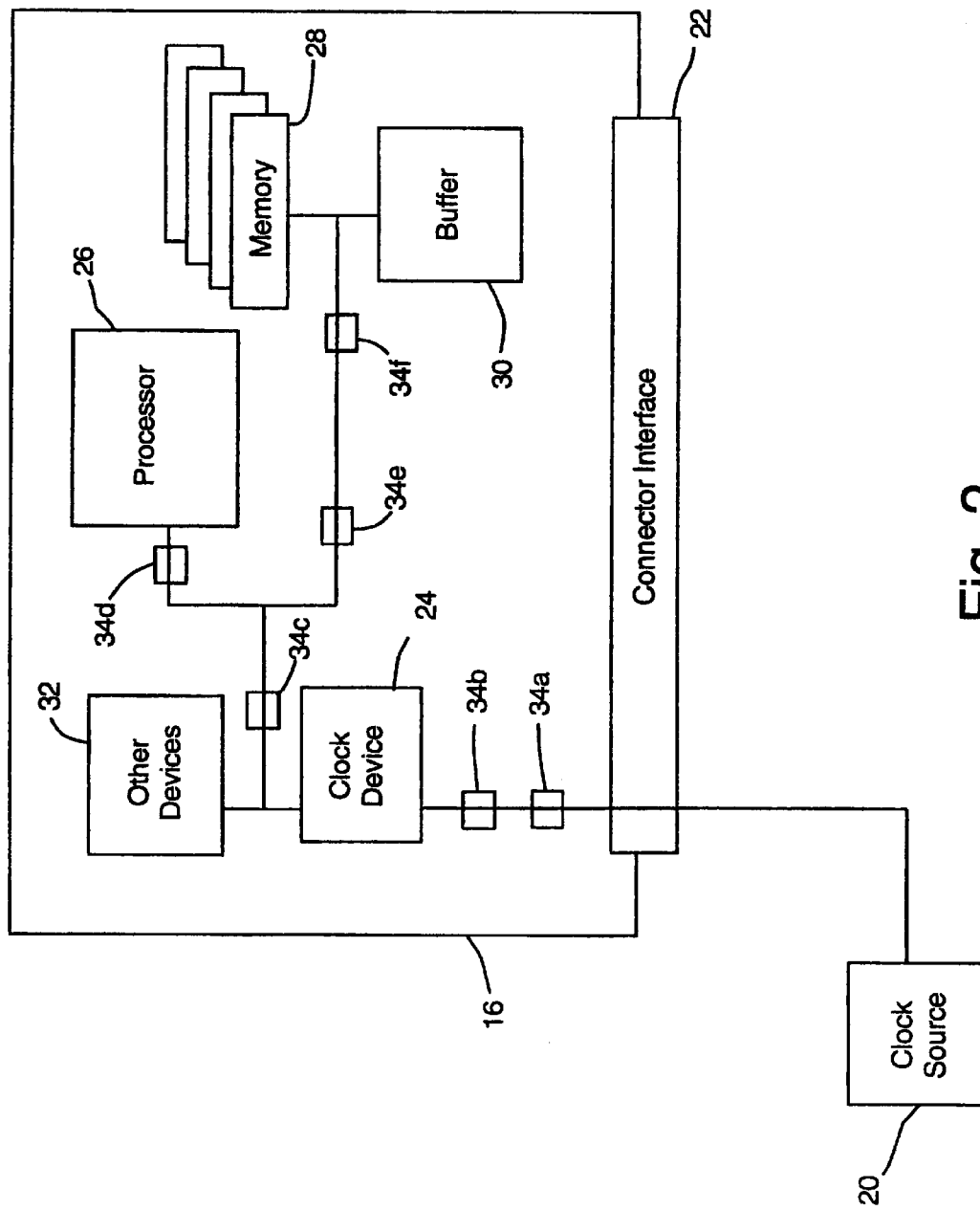
FIG. 2 is a schematic diagram depicting a prior art CCA.

Referring to FIG. 4, the CCA components previously described in reference to FIG. 1 are seen, except that capacitors 34a through 34f have been replaced with coupler 30. Again coupler 30 is completely resistive in nature, thus allowing for the integrity of the regular clock pulse signal to remain unchanged, except for magnitude, as the signal passes through coupler 30.

Further, less space on the CCA ia occupied by components, allowing for either a smaller circuit card, or for more circuitry to be placed on that CCA.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A voltage lowering apparatus located on a removable circuit card, where said removable circuit card assembly also has a bus interface connector configured to operably and removably connect to a bus on a motherboard and where said motherboard provides a regular clock pulse available on said bus, comprising:

a first resistor having a first input and a first output;

a second resistor having a second input and a second output;

a first transmission line having a first input and a first output, where said first input is operably connected to said bus interface connector and to said regular clock pulse and where said first output is operably connected to said first input of said first resistor and where first output of said first resistor is operably connected to a junction point, and where said second input of said second resistor is operably connected to said junction point and said second output of said second resistor is operably connected to ground;

a second transmission line having a second input and a second output where said second input of said second transmission line is operably connected to said junction point, and where said second output of said second transmission line is operably connected to devices on said removable circuit card.

2. The apparatus of claim 1 wherein said removable circuit card has a maximum voltage requirement and said motherboard provides a regular clock pulse having maximum voltage and where said first resistor has a value R1 and said second resistor as a value R2, and where the values of R1 and R2 are determined as a function of said maximum voltage requirement and said maximum voltage of said regular clock pulse.

3. The apparatus of claim 1, wherein said first and second transmission lines have substantially the same impedance.

4. A voltage lowering apparatus located on a motherboard, said motherboard also having a bus configured to operably and removably allow connections to at least one removable circuit card, and where said motherboard provides a regular clock pulse, comprising:

a first resistor having a first input and a first output;

a second resistor having a second input and a second output where said first input of said first resistor is operably connected to said regular clock pulse on said motherboard, and where said first output of said first resistor is operably connected to a junction point, and where said second input of said second resistor is operably connected to said junction point and said second output of said second resistor is operably connected to ground;

a transmission line having an input and an output where said input of said transmission line is operably connected to said junction point, and where said output of said transmission line is operably connected to said bus on said motherboard.

5. The apparatus of claim 4 further comprising at least one removable circuit card having a maximum voltage requirement and where said regular clock pulse on said motherboard has a maximum voltage and where said first resistor has a value R1 and said second resistor as a value R2, and where the values of R1 and R2 are determined as a function of said maximum voltage requirement and said maximum voltage of said regular clock pulse.

6. A method for providing a modified regular clock pulse on a removable circuit card where said removable circuit card has a bus interface connector comprising:

providing a regular clock pulse on a motherboard, wherein said motherboard also has a bus operably connected to said bus interface connector;

providing said regular clock pulse from said motherboard to said removable circuit card via said bus and said bus interface connector, where said regular clock pulse has a maximum voltage;

modifying said maximum voltage of said regular clock pulse using a plurality of resistors where said plurality of resistors are on said removable circuit card creating thereby a modified regular clock pulse;

making said modified regular clock pulse available to the rest of the components on said removable circuit;

providing thereby a modified regular clock pulse on a removable circuit card.

7. The method of claim 6 additionally comprising:

determining a maximum voltage needed on said removable circuit card;

calculating values for said plurality of resistors using said maximum voltage of said regular clock pulse and said maximum voltage needed on said removable circuit card such that said maximum voltage needed on said removable circuit card is the maximum voltage of said modified regular clock pulse.

8. A method for providing a modified regular clock pulse on a removable circuit card where said removable circuit card has a bus interface connector comprising:

providing a regular clock pulse on a motherboard having a maximum voltage wherein said motherboard also has a plurality of resistors and a bus operably connected to said bus interface connector;

modifying said maximum voltage of said regular clock pulse using said plurality of resistors on said motherboard creating thereby a modified regular clock pulse;

making said modified regular clock pulse available to said removable circuit card via said bus interface connector.

9. The method of claim 8 additionally comprising:

determining a maximum voltage needed on said removable circuit card;

calculating values for said plurality of resistors using said maximum voltage of said regular clock pulse and said maximum voltage needed on said removable circuit card such that said maximum voltage needed on said removable circuit card is the maximum voltage of said modified regular clock pulse.

* * * * *